(12) United States Patent
Farsaie

(10) Patent No.: US 7,697,126 B2
(45) Date of Patent: Apr. 13, 2010

(54) THREE DIMENSIONAL SPATIAL IMAGING SYSTEM AND METHOD

(75) Inventor: Ali Farsaie, New Bern, NC (US)

(73) Assignee: Spatial Integrated Systems, Inc., Rockville, MD (US)

( * ) Notice: Subject to any disclaimer, the term of this patent is extended or adjusted under 35 U.S.C. 154(b) by 182 days.

(21) Appl. No.: 12/061,098

(22) Filed: Apr. 2, 2008

(65) Prior Publication Data

US 2009/0251680 A1   Oct. 8, 2009

(51) Int. Cl.
  *G01C 1/04* (2006.01)
  *G01C 3/08* (2006.01)
(52) U.S. Cl. .................. 356/141.5; 356/4.01; 356/141.1
(58) Field of Classification Search ................ 356/4.01, 356/141.1, 141.5, 614; 382/103, 106, 107
See application file for complete search history.

(56) References Cited

U.S. PATENT DOCUMENTS 4,902,128 A * 2/1990 Siebecker et al. ........ 356/152.1
6,292,215 B1 * 9/2001 Vincent ...................... 348/169
6,480,270 B1 * 11/2002 Studnicka et al. ......... 356/141.1
6,559,933 B1 * 5/2003 Kirkpatrick et al. ........ 356/28.5
6,989,890 B2 * 1/2006 Riegl et al. ................. 356/5.01

* cited by examiner

*Primary Examiner*—Isam Alsomiri
(74) *Attorney, Agent, or Firm*—Fay Sharpe LLP

(57) ABSTRACT

A three dimensional spatial imaging system (10) for generating a three dimensional model of a scanned space includes: a laser rangefinder (42) that obtains spatial data by measuring distances to a plurality of target points within the scanned space; a rotating mirror (46) placed in a path of a laser beam (43) emitted from the laser rangefinder (42), the mirror (46) deflecting the laser beam (43) to varying degrees as the mirror (46) is rotated; a digital camera (52) that obtains image data from photographs of the scanned space; a rotating head (30) on which the laser rangefinder (42), mirror (46) and camera (52) are all mounted, the head (30) rotating up to 360 degrees about a central axis of rotation (64) that is substantially normal to a plane in which the head (30) is rotated; and, a data processor that maps color information from the image data obtained by the camera (52) to the corresponding target points of the spatial data obtained by the laser rangefinder (42).

13 Claims, 3 Drawing Sheets

THREE DIMENSIONAL SPATIAL IMAGING SYSTEM AND METHOD

FIELD

The present inventive subject matter relates to the imaging arts. Particular application is found in conjunction with three dimensional (3D) spatial imaging, and the specification makes particular reference thereto. However, it is to be appreciated that aspects of the present inventive subject matter are also amenable to other like applications.

BACKGROUND

For various reasons, an individual may desire to obtain a model of an actual space, e.g., an interior of a room. More specifically, an individual may wish to capture and/or display 3D image data from any subset of a bounded or partially bounded space. 3D spatial imaging, e.g., finds application in model building, reverse engineering, creation of virtual environments, "as built" site evaluations and/or other applications.

Various approaches to 3D imaging have been previously developed. These approaches, however, have been lacking in one way or another. For example, some previously developed approaches do not provide suitably realistic renderings of the imaged space. However, in some instances, it is desirable to obtain a photo-realistic model, e.g., including the color and/or texture of surfaces. Moreover, many prior art approaches tend to be complicate, time consuming and/or labor intensive. For example, in accordance with some prior art approaches, there may be multiple steps within the imaging process, with each step requiring a separate equipment set-up. Additionally, many prior art systems have limited fields of view and hence cannot map an entire space without moving and repositioning the equipment. Therefore, multiple scans must be taken from various positions in the space, and an experienced operator must then register these scans in order to generate a complete 3D representation of the entire space.

Accordingly, a new and improved system and/or method for 3D spatial imaging is disclosed that overcomes the above-referenced problems and others.

SUMMARY

In accordance with one embodiment, a three dimensional spatial imaging system is provided for generating a three dimensional model of a scanned space. The system includes: a laser rangefinder that obtains spatial data by measuring distances to a plurality of target points within the scanned space; a rotating mirror placed in a path of a laser beam emitted from the laser rangefinder, the mirror deflecting the laser beam to varying degrees as the mirror is rotated; a digital camera that obtains image data from photographs of the scanned space; a rotating head on which the laser rangefinder, mirror and camera are all mounted, the head rotating up to 360 degrees about a central axis of rotation that is substantially normal to a plane in which the head is rotated; and, a data processor that maps color information from the image data obtained by the camera to the corresponding target points of the spatial data obtained by the laser range finder.

In accordance with another embodiment, a three dimensional spatial imaging system for generating a three dimensional model of a scanned space is provided. The system includes: detecting means for detecting distances to a plurality of target points within the scanned space, wherein spatial data generated from the detected distances represents the target points in relation to a first three dimensional coordinate system; imaging means for obtaining images of the scanned space, wherein image data from the obtained images is represented in a second coordinate system different from the first coordinate system; rotating means on which the measuring means and detecting means are mounted, said rotating means rotating up to 360 degrees about a central axis of rotation that is substantially normal to a plane such that the detecting means and imaging means pan through a selected field of view; registration means for registering the spatial data and image data with one another in relation to a common coordinate system; and, processing means for mapping color information from the image data to the spatial data.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENT(S)

Figure 1:
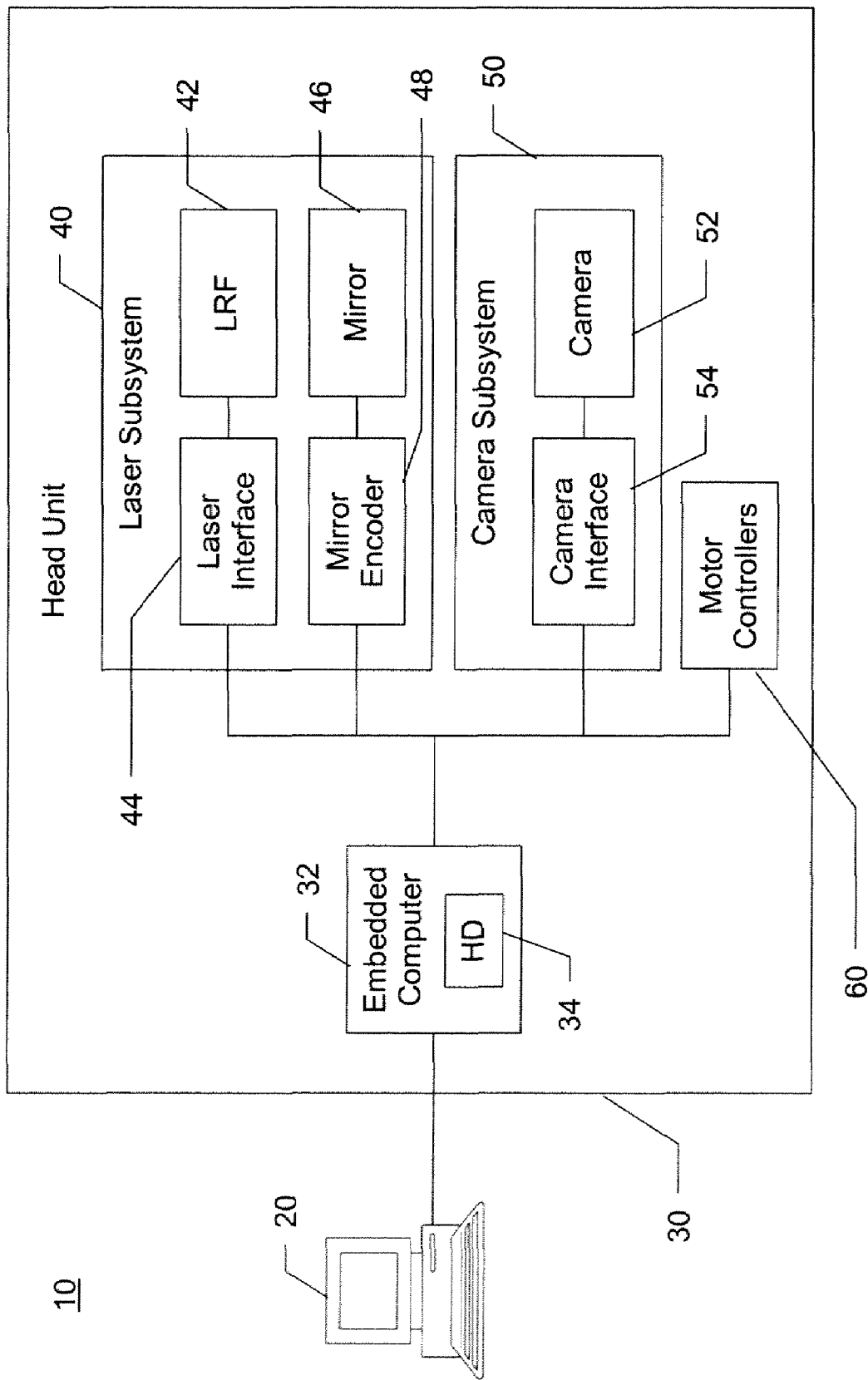
FIG. 1 is a block diagram illustrating the components of an exemplary 3D spatial imaging system suitable for practicing aspects of the present inventive subject matter.

For clarity and simplicity, the present specification shall refer to structural and/or functional elements, relevant standards, protocols and/or processes, and other components that are commonly known in the art without further detailed explanation as to their configuration or operation except to the extent they have been modified or altered in accordance with and/or to accommodate the exemplary embodiment(s) presented herein.

The present specification is directed a spatial imaging system and/or method that is used, for example, to digitally capture 3D image data from any subset of a bounded or partially bounded space. The 3D image data may then be used to create an accurate 3D model of the captured space, e.g., which may be viewed with a suitable viewer on any appropriate output terminal or monitor or otherwise rendered accordingly as desired. Suitably, the system combines laser scanning technologies (i.e., a laser rangefinder) and digital imaging or photography technologies (i.e., a digital camera). Accordingly, the system benefits from the accuracy and rapid data capture of the laser rangefinder and the photo-realistic rendering of the digital camera.

In a suitable embodiment, the laser rangefinder and digital camera are both mounted on a common head or otherwise housed in a common housing that is capable of horizontally panning or rotating 360 degrees about a centrally located axis of rotation that is substantially normal to a horizontal plane. Rapid and/or easy use result from the fact that the system can map an entire or nearly an entire space with a one-time equipment setup. That is to say, generally, there is no need to perform any manual registration of successive scans since the entire or nearly the entire space is captured from one setup position. Suitably, individual substantially vertical "cross sections" of the space are captured by rotating a mirror which reflects the laser light output from the laser rangefinder such that the beam scans an arc of the space in a plane substantially normal to the horizontal plane. The dual rotation of the head and the mirror allows the system to capture distance data within an almost complete spherical field of view (FOV) for all selected points that are visible from a single location without having to reposition the equipment. Suitably, the spherical FOV of the system is limited only by that portion thereof which is obscured by the equipment itself. For example, the mount and/or housing for the laser may block part of the laser's scanning envelope when acquiring data, but in any event, suitably, at least 300 degrees of data can be captured by rotating the mirror at any fixed position of the head.

Suitably, photo-realism is added by merging the spatial data acquired via the laser rangefinder with digital image data captured from the camera mounted on the head. Using ray tracing, a color is assigned to each data point capture by the laser rangefinder. In this manner, a 3D point cloud of data capturer by the system thus has applied thereto the corresponding colors of the objects in the imaged space.

With reference now to FIG. 1, a block diagram shows the components of an exemplary 3D spatial imaging system 10 suitable for practicing aspects of the present inventive subject matter. In the illustrated embodiment, the system 10 includes operating and/or user interface software (i.e., application software) supported, based and/or otherwise running on a host computer 20 (e.g., a laptop computer) as well as a scanning head unit 30 with an embedded computer 32 and other integrated hardware. Suitably, the host computer 20 and the head unit 30 are in operative communication with one another via a suitable connection therebetween, e.g., a wired or wireless Ethernet connection. As illustrated, the head unit 30 is composed of the following parts: the embedded computer 32; a laser subsystem 40; a camera subsystem 50; and, a motor controller subsystem 60. Suitably, the embedded computer 32 includes a hard drive (HD) 34 or other suitable data storage device on which data acquired from the respective subsystems is optionally stored.

In one suitable embodiment, the embedded computer 32 is used to regulate and/or monitor the operation of the head unit's components, e.g., the related hardware or other elements of the various subsystems and/or other components of the head unit 30. The embedded computer 32 also optionally processes un-calibrated laser data from the from the laser subsystem 40 and image processes image data from the camera subsystem 50. Additionally, the embedded computer 32 has an interface that allows operative communication between the head unit 30 and the host computer 20 and/or the application software supported thereon. Suitably, control software for the subsystem hardware and/or other components on the head unit 30, interface software for the interface between the head unit 30 and host computer/application software, and configuration files for the head unit 30, are stored or otherwise maintained on the HD 34. Optionally, the embedded computer 32 also includes a user interface, through which a user may selectively program, set scanning parameters and/or otherwise control operation of the head unit 30.

In the illustrated embodiment, the laser subsystem 40 suitably includes a laser rangefinder (LRF) 42, an interface card 44 that interfaces the LRF 42 with the embedded computer 32, a rotating mirror 46, and a mirror encoder 48 that monitors the rotation of the mirror 46. Optionally, the LRF 42 is any conventional laser rangefinder. For example, a suitable LRF uses an infrared 780 nm 20 milliwatt laser that has a working range of 54 feet (16.6 meters) on a 30% reflectance target, with the accuracy of the laser being 0.2 inches at its maximum working range, or approximately 0.03 percent error. Optionally, the LRF 42 operates on a time-of-flight (TOF) principle to measure the distance or range to a given object by sending a laser pulse in a narrow beam towards the object and measuring the time taken by the pulse to be reflected off the target and returned. Of course, other suitable laser rangefinders may be used. The interface card 44 provides for operative communication between the embedded computer 32 and the LRF 42.

As illustrated, the camera subsystem 50 includes a digital camera 52 and a suitable interface 54 (e.g., an IEEE 1394 or FireWire interface) that provides for operative communication between the embedded computer 32 and the camera 52. Suitably, the digital camera 52 is any conventional digital color camera, e.g., equipped with an appropriate image sensor, optical lens, etc. For example, the camera 52 is optionally equipped with a wide-angle lens to capture a panoramic image of a space with a minimum number of shots. Suitably, the image sensor is implemented as a charge coupled device (CCD), e.g., with a two dimensional (2D) matrix or array of light sensitive elements representing pixels of a captured image.

Figure 2:
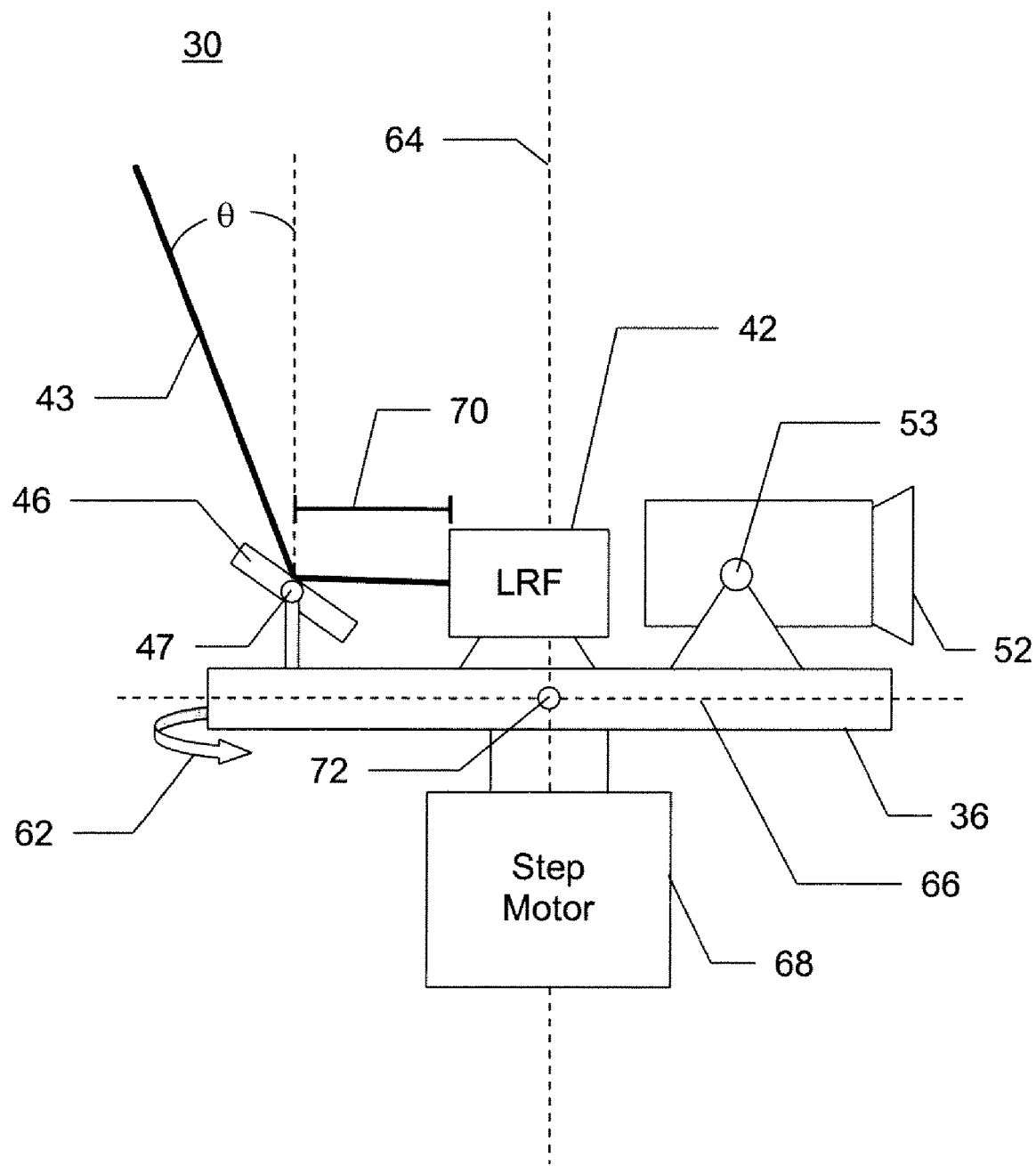
FIG. 2 is a diagrammatic illustration showing a side view of an exemplary head unit for the system shown in FIG. 1.

The motor controller subsystem 60 controls various motors to rotate the mirror 46 and the head unit 30 and to selectively tilt the camera 52. As shown in FIG. 2, the head unit 30 is incrementally panned or rotated (as indicated by the arrow 62) about a central axis of rotation (indicated by a dash line 64) that is substantially normal to a horizontal plane (indicated by a dashed line 66) which is substantially parallel to a base 36 of the head unit 30. In one suitable embodiment, a stepper motor 68 is operatively connected to the base 36 of the head unit 30 and the stepper motor 68 selectively rotates the head unit 30 under the control of the motor controller subsystem 60. Suitably, the resolution of the rotating base 36 is approximately 0.025 degrees and the accuracy is approximately 100 arc seconds. This implies an uncertainty of 0.31 inches at the range of 54 feet.

As shown in FIG. 2, the laser beam 43 emitted by the LRF 42 is initially aligned parallel to the plane 66. However, the rotating mirror 46 is positioned in the path of the laser beam 43 emitted by the LRF 42. Suitably, the rotating mirror 46 is rotated by a motor under the control of the motor controller subsystem 60 about an axis 47 which is substantially normal to the axis 64 and substantially parallel to the horizontal plane 66. Accordingly, at each rotary position of the head unit 30, the rotating mirror 46 deflects the laser beam so as to scan, in an arc, a cross section of the space being captured. Additionally, the motor controller subsystem 60 also controls a motor to selectively tilt the camera 52 up or down about an axis 53 which is substantially normal to the axis 64 and substantially parallel to the horizontal plane 66. Suitably, as illustrated, the LRF 42, rotating mirror 46 and camera 52 are mounted to the base 36 of the head unit 30 and accordingly they are incrementally panned or rotated about the axis 64 along with the head unit 30. Since both the digital camera 52 and the LRF 42 and mirror 46 are mounted on the rotary base 36, the system 10 is able to capture 3D points and digital images of its surroundings. As the head unit 30 turns, the field of view of the camera 52 and the laser subsystem 40 pans through the scene. This allows for capturing data from nearly the entire space without having to reposition the equipment.

Figure 3:
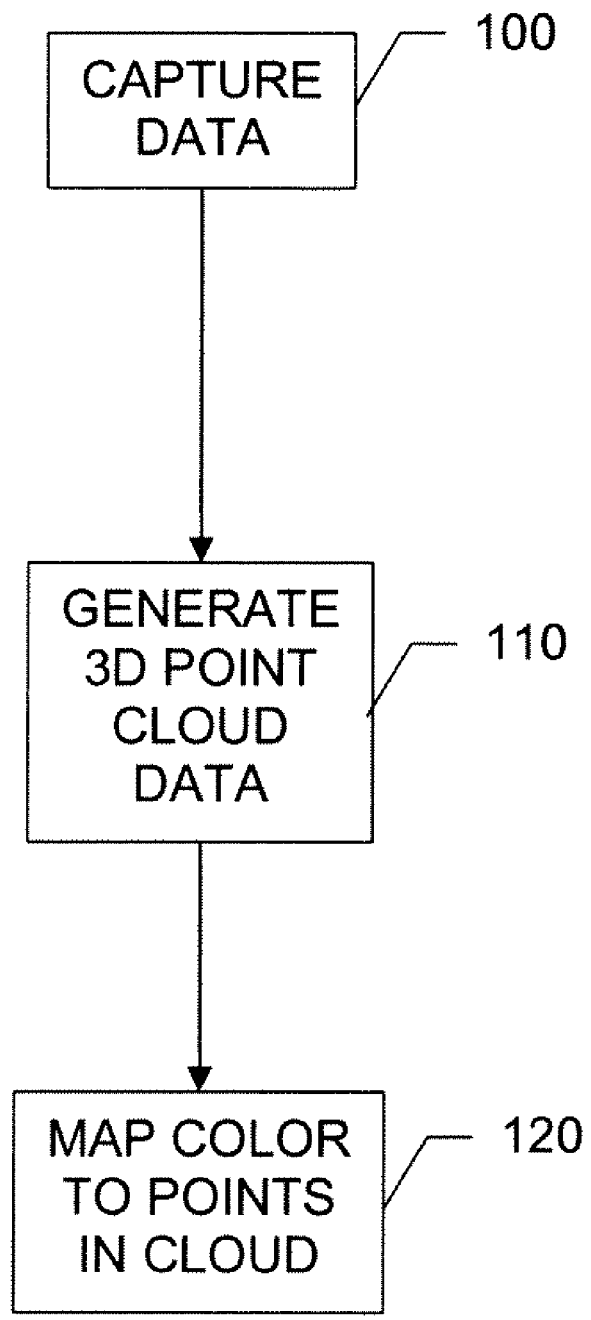
FIG. 3 is flow chart showing an exemplary process for generating a 3D digital model or data set from the data captured with the system shown in FIG. 1.

With reference to FIG. 3, an exemplary process for generating a 3D digital model of a space from the data captured with the system 10 is illustrated. The process includes: capturing data from the various subsystems of the head unit 30 (step 100); generating a 3D point cloud from the data captured by the laser subsystem 40 (step 110); and, applying colors to the points in the point cloud (step 120).

As indicated above, the system 10 has two subsystems for digitally capturing data—the laser subsystem 40 to capture spatial measurements and the camera subsystem 50 to capture color and texture information. Suitably, both subsystems have their own electronic devices and/or other controls to regulate how and from which direction the data is captured. Accordingly, the data capturing step 100 can be thought of as two sub-steps and will be described accordingly.

The laser subsystem 40 produces spatial measurements of the area scanned by the head unit 30. One cross section of data is collected at each incremental rotary position of the head unit 30. The rotating mirror 46 controls the angle of the laser beam 43 emitted from the LRF 42 as it captures one cross section of data. Suitably, the laser subsystem 40 is directed to capture data at any number of increments as the mirror 46 is rotated about its axis 47. Accordingly, as the head unit 30 is incrementally rotated about the axis 64, a plurality of cross sections are collected which are then combined into a single 3D point cloud representing the spatial measurements of the scanned area.

More specifically, the head unit 30 starts at a first position, and the LRF 42 measures the distance to a plurality of target points determined by the varying degree $\theta$ to which the rotating mirror 46 has deflected the laser beam 43 at the time the measurements are taken. These measurements accordingly represents one cross section of data points captured with the head unit 30 at the first position. The head unit 30 is then incrementally rotated about the axis 64 to the next position (along with the LRF 42 and mirror 46 mounted to the base 36 of the unit 30), and the LRF 42 again measures the distance to a plurality of target points determined by the varying degree $\theta$ to which the rotating mirror 46 has deflected the laser beam 43 at the time the measurements are taken. These measurements accordingly represent the next cross section of data points captured with the head unit 30 at the next position. Spatial measurements are taken in this manner for each subsequent incremental rotation of the head unit 30 until the scan is complete. The combined cross sections of data points accordingly produce a single 3D point cloud of the space scanned.

As can be appreciated, the laser subsystem 40 is able to capture a cross section of points from a space in one complete revolution of the mirror 46 with the laser beam 43 being deflected by the varying angle $\theta$ to follow an arc or circular path. Moreover, by rotating the head unit 30 through as many as 360 degrees about the axis 64, it is possible to obtain a complete set of points for the entire or nearly the entire space. Optionally, using the host computer 20 or other interface, a user may select the increments at which the head unit 30 is rotated and/or designate a start and stop position for the head unit 30 so that individual cross sections are captured from any sub-range of 0-360 degrees of head unit rotation with a desired degree of resolution. Similarly, a user may select the increments and/or start and stop times at which measurements are taken by the laser subsystem 40 with respect to the rotation of the mirror 46. In any event, however, this architecture allows the capture of a set of cross sections that can be combined into one 3D point cloud representing the head unit's surroundings.

In a suitable embodiment, at specified increments (as described above), the LRF 42 collects or otherwise measure values, r, representing the distance from the LRF 42 to a target object. For each collected r value, the value of the deflection angle $\theta$ produced by the current rotational position of the mirror 46 is also collected or otherwise recorded by the laser subsystem 40, e.g., via the mirror encoder 48 which monitors the rotation of the mirror 46. In addition, an angle of rotation of the head unit 30 about the axis 64 (e.g., given as an angular value, $\phi$, measured from a zero or starting position of the head unit 30) is also known, e.g., from the motor controller subsystem 60. Accordingly, the laser subsystem 40 yields or otherwise outputs a 3D point cloud or corresponding set of data points where each 3D point is defined by a set of spherical coordinates (r, $\theta$, $\phi$). Suitably, during the spatial measurement portion of the data capture step 100, these 3D points defined by sets of spherical coordinates (r, $\theta$, $\phi$) are communicated to the embedded computer 32 and in turn transferred to the host computer 20. Optionally, during the 3D point cloud generation step 110 the spherical coordinates are converted to rectangular coordinates.

As pointed out above, during the data capture step 100, the laser subsystem 40 is directed by the system 10 to acquire a cross section of data at each fixed position the rotating head unit 30. Suitably, it takes approximately one second to capture a single cross section, and an additional one-half second for the rotating head unit 30 to move to the next position. In one suitable embodiment, approximately 5,000 points are captured at each incremental position of the head unit 30.

Additionally, during the data capture step 100, the camera subsystem 50 also collects color image data. The function of the camera 52 is to capture color and texture data from the space. The system 10 then combines the range data from the laser subsystem 40 with the digital images from the camera subsystem 50 to build photo-realistic 3D point clouds. As pointed out previously, a wide-angle lens is used on the camera 52 to allow the system 10 to capture a panoramic image of a space with a minimum number of shots. During the camera subsystem portion of the data capture step 100, the camera is successively and/or incrementally panned about the axis 64 (via rotation of the head unit 30) and/or selectively tilted about the axis 53 (e.g., under the control of the motor controller subsystem 60). Suitably, digital images or photographs are taken at selected head and tilt positions so as to achieve full coverage of the space being scanned—or, should the user prefer—a suitable subset of the space. Again, as the camera 52 is mounted to the rotating base 36 of the head unit 30, the FOV of the camera 52 optionally ranges from 0-360 degrees about the axis 64. Additionally, movement about the camera tilt axis 53 provides the camera 52 a nearly complete FOV in the vertical direction, e.g., obstructed only by the equipment itself. Suitably, the individual color digital images or photographs from the camera 52 are stitched together to generate a panoramic view of the entire scanned space. For example, any suitable image stitching process may be employed to combine the individual images. Suitably, the digital image data is communicated to the embedded computer 32 via the interface 54 and in turn transferred to the host computer 20.

Having obtained the spatial data from the laser subsystem 40 and the digital color image data from the camera subsystem 50, data processing can be carried out to generate the 3D point cloud (i.e., step 110) and map the colors from the image data to the data points of the 3D point cloud (i.e., step 120). Suitably, the host computer 20 and/or application software supported thereon performs the color mapping. To facilitate the foregoing processes, a common point or frame of reference is established and the data from the laser subsystem 40 and the camera subsystem 50 is aligned or otherwise coordinated therewith. That is to say, the relative coordinate system in which measurements are taken by the laser subsystem 40 is generally different than the relative coordinate system in which image data is capture by the camera subsystem 50, for example, due to the relative displacement of the components from one another. Accordingly, it is advantageous to first align the two different coordinate systems to one common coordinate system. Suitably, the common coordinate system is a rectangular coordinate system with its original at the center of the rotating head 30, i.e., on the central axis of rotation 64. Accordingly, several coordinate transformations are performed to align the data from the laser and camera subsystems to the common coordinate system.

In a suitable embodiment, to generate the 3D point cloud, the raw data collected by the laser subsystem 40 is operated upon by the system 10 to align the coordinate system of the laser subsystem 40 with the coordinate system of the head unit 30. Additionally, the raw data defined in spherical coordinates $(r, \theta, \phi)$ is converted to a rectangular coordinate system.

More specifically, it was noted that for each data point collected by the laser subsystem 40, a set of spherical coordinates is returned. These coordinates are $(r, \theta, \phi)$, where:

r is the distance measured by the LRF 42;

$\theta$ is the angle of the laser beam 43 with respect to the vertical 64; and, $\phi$ is the angle of rotation of the head unit 30 about the axis 64.

Recall that r and $\theta$ are returned by the laser subsystem 40 and $\phi$ is known, e.g., from the motor controller subsystem 60. Note that the distance r measured by the LRF 42 not only includes the distance from the target point reflecting the laser beam 43 to the mirror 46, but also the distance from the mirror 46 to the LRF 42 (which distance is indicated in FIG. 2 by reference numeral 70).

Suitably, the y-axis of the common coordinate system lies on the axis 64; the z-axis of the common coordinate systems aligns with the dashed line 66 (as shown in FIG. 2); and, the x-axis aligns with the axis 72 (as shown in FIG. 2). To place the spherical coordinates of the raw data obtained by the laser subsystem 40 into the common rectangular coordinate system, the returned data point triple $(r, \theta, \phi)$ is converted into rectangular coordinates $(x, y, z)$. Suitably, the rectangular coordinates of any scanned point in space relative to the common coordinate system are determined by subtracting the distance from the LRF 42 to the mirror 46, and then accounting for the mirror rotation as follows:

$x = (r - \text{mirror\_to\_LRF\_distance}) * \cos(\theta)$; and, $y = (r - \text{mirror\_to\_LRF\_distance}) * \sin(\theta)$.

The data is then offset by a translation transform, $T_{1L}$, that accounts for the distance from the center of the mirror 46 to the center of the head unit 30, i.e., the origin of the established common coordinate system. A rotation transform, $R_{1L}$, is then applied to rotate all the points to account for the current position of the head unit 30 based on the value of $\phi$. After these transformations the 3D scanned points are then in the world coordinate system for this scan, i.e., the established common coordinate system.

In a suitable embodiment, four transformations are used to map the camera's coordinate system to established common coordinate system, i.e., the coordinate system of the head unit 30. For example, the four transformations are the following:

1. Translation transform $T_{1C}$ translates the center of the camera's CCD to align with the camera's tilt axis 53;
2. Rotation transform $R_{1C}$ rotates the points to account for the current angle at which the camera 52 is tilted about the axis 53;
3. Translation transform $T_{2C}$ translates the center of the tilt axis 53 to the center of the head unit 30 (i.e., the origin of the established common coordinate system); and,
4. Rotation transform $R_{2C}$ rotates all the points to account for the current angle of the head unit 30.

Accordingly, the composition $R_{2C}°T_{2C}°R_{1C}°T_{1C}$ maps the camera subsystem's coordinate system to that of the head unit 30, i.e., the established common coordinate system, such that the focal point of the camera's lens corresponds to the origin of the common coordinate system.

Having aligned the coordinate systems as described above, it is now possible to locate the image sensor or CCD of the digital camera 52 in the common coordinate system and map the colors from the digital image captured by the camera subsystem 50 to the data points collected by the laser subsystem 40. Suitably, this is accomplished using a ray tracing technique.

More specifically, a ray is drawn from a particular 3D point in the generated point cloud through the origin of the common coordinate system, and the point of intersection with the camera's sensor is determined. The equation of the sensor is simply $z=d$ where d is a negative, fixed constant indicating the position on the z-axis where the CCD is located. In a suitable embodiment, the specific pixel corresponding to a given 3D point is determined as follows.

Suitably, the equation of the ray is defined as follows:

$(x(t), y(t), z(t)) = (1-t) * (X, Y, Z)$, where t is a parameter and $(X, Y, Z)$ is the value of the given 3D point under consideration. This in turn reduces to:

$x(t) = (1-t) * X$, $y(t) = (1-t) * Y$, and $z(t) = (1-t) * Z$.

To compute the point of intersection of the ray and the CCD of the camera 52, $(1-t)*Z$ is set equal to d, and the equation is solved for t to arrive at:

$t = (Z-d)/Z$.

Next, the $x_{CCD}$ and $y_{CCD}$ coordinates of the ray's intersection point on the CCD is determined using the value of t, to arrive at:

$x_{CCD} = (1-(Z-d)/Z) * X$, and $y_{CCD} = (1-(Z-d)/Z) * Y$.

Once the intersection point has been identified, the intersection point $(x_{CCD}, y_{CCD})$ is converted or translated to a particular pixel on the CCD. The conversion to pixels depends on the actual size or dimensions of a pixel. In many CCDs, a pixel's width and height are approximately 0.0044 mm, but in any event it is generally the case that they are constant, say W and H. Similarly, the center of the CCD is generally a fixed pixel, say having a location $(x_c, y_c)$, with world coordinates $(0, 0, d)$. Thus the following formulas arise to identify the pixel corresponding to the intersection point of the ray with the CCD:

$\text{Pixel\_}x = x_{CCD}/W + x_c$, and $\text{Pixel\_}y = y_{CCD}/H + y_c$.

Finally, to complete the mapping of color to the 3D point under consideration, the color of the pixel at pixel location (Pixel_x, Pixel_y) is assigned to the 3D point. Suitably, in this manner, the color mapping is applied to each 3D point in the generated point cloud. In an exemplary embodiment, the pixel color is defined in a triplet value represent three specific color separation, e.g., the triplet represents the red, green, and blue (RGB) content of the pixel. Suitably, when the color values are applied to the spatial data, the result for each point is a 6-tuple which has the form (x, y, z, R, G, B).

In a suitable embodiment, the foregoing data processing is optionally performed by the embedded computer 32 or the host computer 20, and the results stored, e.g., in a data storage device incorporated in and/or otherwise accessible by the host computer 20. In addition to the 3D point cloud data and color data, grayscale data is also optionally stored therewith. Suitably, the intensity mapped from the reflectance of the returned laser beam 43 is used to assign greyscale values to the data points in the 3D point cloud.

As described above, the system 10 generates a spatially accurate, photo-realistic 3D model of the scanned space in accordance with the captured data. Suitably, to provide a meaningful output, the host computer 20 and/or application software supported thereon is equipped or otherwise provided with a viewing tool for examining and manipulating the generated model. The viewing and imaging tool displays the generated model while, at the same time, providing navigation tools that enable viewing the model from various perspectives. Suitably, the tool can be used for inspecting, measuring and ensuring the quality of the model before exporting the models into other applications. Suitably, the viewing tool has file menu selections for opening models, importing other model types, exporting models to other applications, and exiting the viewer. Optionally, edit menu selections are provided for copying selected sets of data points, cutting selected sets of data points, pasting sets of data points from previous copy or cut operations, and for deleting sets of data points. A selection is also optionally provided for setting user preferences. In a suitable embodiment, a view menu provides selections for setting a navigation mode, for adjusting the FOV, for centering the viewed model in the view area, and for selecting various viewpoints. Provision is also made for setting the view area to a full screen mode, for adjusting display options, for showing the X, Y and Z axes, or for showing the X, Y and Z planes in the view area. Other optional tool bars and status bars may also be provided. While this overview of the viewing and imaging tool provides a basic description of the tool, it is not an exhaustive description, and additional features and menus may be provided with the tool as are well known in the art.

Suitably, the exemplary viewing and imaging tool provides four ways to view models. A fly mode, the default mode, provides flexible navigation in the view area. This mode is similar to the interactive modes used on many interactive video game systems. A spin mode permits rotating the 3D model in the view area on each of its axes so the model can be viewed from various perspectives. A pan mode allows the user to pan around the 3D model in the view area. A zoom mode provides for zooming in towards the 3D model or out from the 3D model. While the aforementioned modes provide a variety of viewing options, the viewing and imaging tool is not limited in scope to these modes and other modes may be provided.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Moreover, directional terms such as "horizontal" and "vertical" have been used in describing the drawings and/or embodiments presented herein. These terms are used to aid the reader in understanding the drawings and/or embodiments and are not intended to limit the invention to any exact orientation. Similarly, various axes, planes, variables and/or other parameters have been described with reference to particular orientations and/or using nominal labels. Again, this is to aid the reader in understanding the drawings and/or embodiments presented herein and it is not indented to limit the invention.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A three dimensional spatial imaging system for generating a three dimensional model of a scanned space, said system comprising:
   a laser rangefinder that obtains spatial data by measuring distances to a plurality of target points within the scanned space;
   a rotating mirror placed in a path of a laser beam emitted from the laser rangefinder, said mirror deflecting the laser beam to varying degrees as the mirror is rotated;
   a digital camera that obtains image data from photographs of the scanned space;
   a rotating head on which the laser rangefinder, mirror and camera are all mounted, said head rotating up to 360 degrees about a central axis of rotation that is substantially normal to a plane in which the head is rotated, wherein the laser rangefinder, mirror and camera are all mounted substantially on the same plane in which the head is rotated; and,
   a data processor that maps color information from the image data obtained by the camera to the corresponding target points of the spatial data obtained by the laser rangefinder.

2. The system of claim 1, wherein the mirror rotates about an axis which is substantially normal to the central axis of rotation of the head and substantially parallel to the plane in which the head is rotated.

3. The system of claim 1, wherein the camera is mounted on the head so as to be selectively tiltable about an axis which is substantially normal to the central axis of rotation of the head and substantially parallel to the plane in which the head is rotated.

4. The system of claim 1, further comprising:
a step motor that incrementally rotates the head through a series of positions, such that at each position the laser rangefinder obtains a cross section of the spatial data as the rotating mirror deflect the laser beam to varying degrees.

5. The system of claim 1, wherein the laser rangefinder and mirror comprise a laser subsystem having a first coordinate system in which the spatial data is obtained, and the camera has a second coordinate system in which the image data is obtained.

6. The system of claim 5, wherein the data processor registers the first coordinate system with the second coordinate system prior to mapping the color information.

7. The system of claim 5, wherein the first and second coordinate systems are registered to a common third coordinate system having an origin lying on the central axis of rotation of the head.

8. The system of claim 1, further comprising:
a mirror encoder that monitors the rotation of the mirror.

9. A three dimensional spatial imaging system for generating a three dimensional model of a scanned space, said system comprising:
detecting means for detecting distances to a plurality of target points within the scanned space, wherein spatial data generated from the detected distances represents the target points in relation to a first three dimensional coordinate system;
imaging means for obtaining images of the scanned space, wherein image data from the obtained images is represented in a second coordinate system different from the first coordinate system;
rotating means on which the measuring means and detecting means are mounted, said rotating means rotating up to 360 degrees about a central axis of rotation that is substantially normal to a plane such that the detecting means and imaging means pan through a selected field of view, wherein the detecting means and the imaging means are all mounted substantially on the same plane in which the rotating means is rotated;
registration means for registering the spatial data and image data with one another in relation to a common coordinate system; and,
processing means for mapping color information from the image data to the spatial data.

10. The system of claim 9, wherein the detecting means comprises:
measuring means for measuring a distance traveled by a laser beam between a source of the laser beam and the target point from which the laser beam is reflected; and,
deflection means arranged in a path of the laser beam for selectively deflecting the laser beam at a plurality of angles.

11. The system of claim 10, wherein the measuring means is a laser range finder and the deflecting means is a rotating mirror that rotates about an axis which is substantially normal to the central axis of rotation of the rotating means and substantially parallel to the plane.

12. The system of claim 9, wherein the imaging means comprises a digital color camera.

13. The system of claim 12, wherein the camera is mounted on the rotating means so as to be selectively tiltable about an axis which is substantially normal to the central axis of rotation of the rotating means and substantially parallel to the plane.

* * * * *